3,387,935
PREPARATION OF PHOSPHORUS
TRI-FLUORIDE
Albert W. Jache, North Haven, and Santad Kongpricha, Hamden, Conn., assignors to Olin Mathieson Chemical Corporation
No Drawing. Filed Feb. 3, 1966, Ser. No. 524,815
3 Claims. (Cl. 23—205)

ABSTRACT OF THE DISCLOSURE

Phosphorus trifluoride is prepared by the reaction of elemental phosphorus with liquid, anhydrous hydrogen fluoride under autogenous pressure at 180 to 220° C.

This invention relates to an improved process for the manufacture of phospohorus trifluoride.

Mutterties et al., J. Inorg. Nucl. Chem., 18, 148 (1961) formed phosphorus trifluoride at 5% conversion by heating red phosphorus with hydrogen fluoride at 500° C. under pressure.

According to the process of this invention, elemental phosphorus is heated in an excess of anhydrous hydrogen fluoride at temperatures of about 180 to 220° C. under autogenous pressure suitably for from about 3 to 20 hours. The mixture is heated suitably in a confined reaction zone, for example, a Monel or nickel pressure vessel. The proportion of hydrogen fluoride to phosphorus is suitably from about 5:1 to 50:1 but more or less is satisfactory.

At temperatures substantially below 180° C., the yields diminish and become unsatisfactory. At temperatures above about 220° C. yields again diminish. At the temperatures used in the process of this invention, a portion of the hydrogen fluoride is in the liquid phase forming a medium for reaction.

The elemental phosphorus is charged in the yellow or red form, more conveniently the latter. However, at the preferred reaction temperatures, unreacted phosphorus is converted into the thermally more stable yellow form.

When the reaction is completed, the reaction mixture is cooled and separated by low temperature fractionation. By-product hydrogen, the phosphorus trifluoride product and excess HF are readily separable from the reaction mixture. Hydrogen boils at −252.8° C., PF$_3$ at −95° C. and HF at 19.4° C.

Example I

A 300 ml. Monel-lined pressure vessel fitted with a pressure gauge was charged at atmospheric pressure with red phosphorus and hydrogen fluoride. The pressure vessel was closed and the mixture was heated with shaking to the desired temperature and for the desired period.

Following this procedure the vessel was charged with 8.63 g. (0.277 mole) of red phosphorus and 64.5 g. of HF. The mixture was heated at 200° C. for 15 hours and then cooled to room temperature. The gaseous products were discharged from the reactor, condensing the HF at Dry Ice temperatures in one cylinder and PF$_3$ at liquid nitrogen temperatures in another. The hydrogen was allowed to escape from the system. The yield of PF$_3$ amounted to 6.6 g.

Example II

The procedure of Example I was substantially repeated using 8.63 g. (0.277 mole) of red phosphorus and 53 g. of HF. The mixture was heated at 210° C. for 11 hours. A yield of 6.6 g. of PF$_3$ was obtained.

Example III

The procedure of Example I was repeated using 8.63 g. (0.277 mole) of red phosphorus and 39 g. of HF. The mixture was heated at 210° C. for 11 hours resulting in a yield of 5.5 g. of PF$_3$.

What is claimed is:

1. Process for preparing phosphorus trifluoride which comprises heating a mixture of elemental phosphorus and anhydrous hydrogen fluoride, at least a portion of said hydrogen fluoride being in the liquid phase, at 180 to 220° C. under autogenous pressure to form a reaction mixture containing phosphorus trifluoride and separating said phosphorus trifluoride from said reaction mixture.

2. Process according to claim 1 in which the molar ratio of hydrogen fluoride to phosphorus is from 5:1 to 50:1.

3. Process according to claim 1 in which the elemental phosphorus is red phosphorus.

References Cited

Muetterties, E. L., and Castle, J. E.: "Journal of Inorganic and Nuclear Chemistry," 1961, vol. 18, pp. 148–150, Pergamon Press.

Mellor, J. W.; A Comprehensive Treatise on Inorganic and Theoretical Chemistry, vol. VIII, p. 785, Longmans Green & Co., London, 1928.

OSCAR R. VERTIZ, Primary Examiner.

MILTON WEISSMAN, Examiner.

G. PETERS, Assistant Examiner.